(12) United States Patent
Takahashi et al.

(10) Patent No.: US 7,130,077 B2
(45) Date of Patent: Oct. 31, 2006

(54) DOCUMENT-READING APPARATUS AND METHOD FOR THE SAME

(75) Inventors: Naoki Takahashi, Kyoto-fu (JP); Kazuyuki Murata, Kyoto-fu (JP); Hideyuki Kuwano, Osaka-fu (JP); Takashi Nakanishi, Hyogo-ken (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 659 days.

(21) Appl. No.: 09/969,904

(22) Filed: Oct. 4, 2001

(65) Prior Publication Data

US 2002/0041407 A1    Apr. 11, 2002

(30) Foreign Application Priority Data

Oct. 5, 2000    (JP)    ............... 2000-305858

(51) Int. Cl.
   *G06K 15/00*    (2006.01)
   *G06K 9/00*    (2006.01)
   *H04N 1/04*    (2006.01)

(52) U.S. Cl. .................. 358/1.9; 358/486; 382/312

(58) Field of Classification Search ............. 358/1.9, 358/444, 448, 486; 382/297, 305, 312
   See application file for complete search history.

(56) References Cited

U.S. PATENT DOCUMENTS 5,488,485 A * 1/1996 Amemiya .................. 358/444
5,579,419 A * 11/1996 Yaguchi et al. ............. 382/305
5,889,596 A * 3/1999 Yaguchi et al. ............. 358/448
6,323,959 B1 * 11/2001 Toyama et al. ............. 382/312

FOREIGN PATENT DOCUMENTS

JP    11-027444    1/1999

* cited by examiner

*Primary Examiner*—Kimberly Williams
*Assistant Examiner*—Charlotte M. Baker
(74) *Attorney, Agent, or Firm*—McDermott Will & Emery LLP

(57) ABSTRACT

An apparatus for simultaneously reading images on both sides of the document sheet as the sheet having images on both sides is moved through the apparatus, one side read by a CCD sensor and the other side read by a contacted image sensor. An image synthesizing unit synthesizes image data from the CCD sensor and image data from the contacted image within one cycle of main scanning by the two image reading units. Furthermore, image processing circuits in the subsequent steps perform specific modes of processing on the data within one cycle of main scanning. That permits simultaneous reading of both sides of the sheet document without reducing document reading speed and expansion of the image processing unit.

22 Claims, 16 Drawing Sheets

DOCUMENT-READING APPARATUS AND METHOD FOR THE SAME

FIELD OF THE INVENTION

The present invention relates to an apparatus for reading sheet documents. More specifically, this invention concerns an apparatus for simultaneously reading images on both sides of the document sheet as this sheet having images on both sides is moved through the apparatus.

BACKGROUND OF THE INVENTION

In the past, the common method of reading a document sheet with images on both sides was to read one side first, then turn over the sheet and read the back side.

That is, document sheets are loaded at the starting position and sent out to a document reading table one after another. And after one side of the document sheet is read on the document reading table, the document sheet is turned over and brought back to a discharge point. And the reverse side of the document faces the document-reading table and the reverse side is read.

In recent years, a new apparatus has been proposed which simultaneously reads both sides of the sheet instead of reading one side and then another side as in the conventional technique. In an apparatus disclosed in Japanese laid open patent application No. 11-27444, for example, two document-reading units are provided so that as the document sheet is conveyed, the two sides of the sheet can be read at the same time. The mechanism of the apparatus will be explained with reference to FIG. 15.

First, there is provided a document glass 100h on the upper surface of a reduction optical system that performs sub-scanning by moving a light source and mirrors. And a document pressing plate unit 101 is provided over that. On one side of the document pressing plate unit 101 is provided a sheet feeder unit 103.

The sheet feeder unit 103 is provided with a document stacker 108, a preliminary feeding unit 111, a separation unit 110, a document feeding unit 104, a U turn path 103a, an opening A2 defined on the lower surface of the conveying path, a contacted image sensor 113 provided on the upper side of the conveying path and a document discharge unit 105a provided most downstream. Those components are arranged in that order from the document feeding side. The contacted image sensor 113 is an image sensor so designed that a sensor with a short focal distance and its nearby light source are brought into contact with the document sheet to read the surface of the document. Since the contacted image sensor 113 is easy to reduce in size, it is widely used in the sheet-through-type reading apparatuses.

Furthermore, under the opening A2, there is provided an empty space to accommodate a mirror 100a making up an optical system of a book scanner unit 100. And it is so arranged that a light source 100g of the book scanner unit 100 sheds light on the document through the opening A2 and that the document surface thus irradiated is reflected on the mirror 100a accommodated in the space.

This apparatus is provided with the so-called "book scanner unit" in which the document sheet is placed on the document glass 100h and scanned by moving the optical system and a sheet scanner unit 120 having a document conveying apparatus equipped with a sheet separation mechanism in an upper part of the document glass 100h. That permits reading the document sheet by the sheet scanner unit 120 while moving the document sheet unlike the typical conventional copying machine in which the document sheet is conveyed to a specific position to stand still and scanned.

The book scanner unit 100 is provided with a scanning mechanism for scanning the document sheet standing still on the document glass 100h and a charge coupled device (CCD) sensor 100e for photoelectric conversion of a document image inputted through this scanning mechanism. That is, the document sheet placed on the document glass 100h is irradiated with the light source 100g that moves along with the mirror 100a and the reflector 100f to reflect the light from the light source 100g so that the lightness on the document surface reaches a specific level. Then, the document image displayed on the mirror 100a is reflected on a second mirror 100b, a third mirror 100c etc. and then sent to CCD sensor 100e through a group of lens 100d for photoelectric conversion. Then, the electric signal photoelectrically converted by CCD sensor 100e is sent out to an image processing unit (not shown).

The first mirror 100a moves from the first reading position B1 to the second reading position B2 when a still document sheet is read. Meanwhile, when the reverse side of a sheet document S loaded on the document stacker 108 is read, the first mirror 100a moves and stops under the opening A2, and, through the opening A2, reads the document sheet S passing through the document conveying path.

From a pile of the loaded document sheets S, the separation unit 110 separate sheets one by one at the bottom of the pile. Through the document conveying path 103, the document sheet S thus separated is conveyed to the opening A2 and the document face reading unit A3 provided downstream. And while the document sheet S is being conveyed, one side of document sheet S is read by the contacted image sensor 113 in the document face reading unit A3.

The other side of the document sheet S is reflected on the first mirror 100a moving just under the opening A2 and the document image enters CCD sensor 100e through the second mirror 100b, the third mirror 100c etc. and photoelectrically converted by this CCD sensor 100e. The document sheet S thus read is discharged on a paper discharge tray 106 by a document discharge unit 105a.

FIG. 16 is a block diagram of the overall control system of this apparatus. The configuration of the apparatus will be explained.

First, the outer interface 309 conforms to serial interface standards such as RS 232. That makes it possible to connect the present apparatus to peripheral equipment of the computer. That is, it is possible to utilize the present apparatus as image scanner or local printer, and also network printer.

Also, to the inner interface, the following are connected: scanning unit 302, displaying unit 303, reading unit 304, recording unit 305 and communication control unit 306. The reading unit 304 is made up of a fixing and reading unit 304a and a movement fixing and reading unit 304b. Furthermore, the fixing and reading unit 304a has a sheet scanner control unit 328 and a book scanner control unit 324.

Here, an image synthesizing unit 340 that corresponds to an image synthesizing unit selects and synthesizes image data read by the book scanner unit 100 and the contacted image sensor 113. That is, this apparatus is provided with a selection unit for selecting the image on the moving document (document sheet S) and the image of the still image (book document) page by page. And the image data on the page selected by the selection unit are synthesized by the image synthesizing unit.

Under the arrangements just described, both sides of the document sheet can be read simultaneously and images can be formed one after another. This arrangement for reading both sides at the same time has an advantage that because the document sheet is read as it passes through the apparatus only once instead of reading one side and turning over the page and then reading the other side, the possibility of damaging the document sheet will substantially decrease.

The document reading apparatus just described is so designed as to read both sides of the document sheet at the same time, and therefore, the amount of image data processed per unit time will double. Therefore, the document reading speed has to be halved or two image processing systems have to be provided.

That is, the problem is that if the document reading speed is halved, the productivity will decrease, and if two image processing systems are provided, the cost will increase.

SUMMARY OF THE INVENTION

The present invention having been made in view of the prior art just described, including the disadvantages of the prior art, it is an object of the present invention to provide a document reading apparatus that permits simultaneous reading of both sides of the document sheet without reducing the reading speed and expansion of the image processing unit.

In other words, the present invention is based on a document reading apparatus in which a first image reading unit (CCD sensor) reads one side of the document sheet and at the same time a second image reading unit (contact-type image sensor) reads the other side of the document sheet as shown in FIG. 2.

Here, an image synthesizing unit (image synthesizer 45) synthesizes the first image data from the first image reading unit and the second image from the second image reading unit within one cycle of the main scanning of the two image reading units. And the subsequent image processing unit (an edge emphasizing circuit 46, a zoom circuit 47, a gradation change circuit 48, a binarization circuit 49) performs specific modes of processing on the image data from the image synthesizing unit within one cycle of the main scanning.

This way, it is possible to simultaneously read the two sides of the document sheet without reducing the document reading speed and expanding the image processing circuit.

DESCRIPTION OF THE PREFERRED EMBODIMENTS

Figure 1:
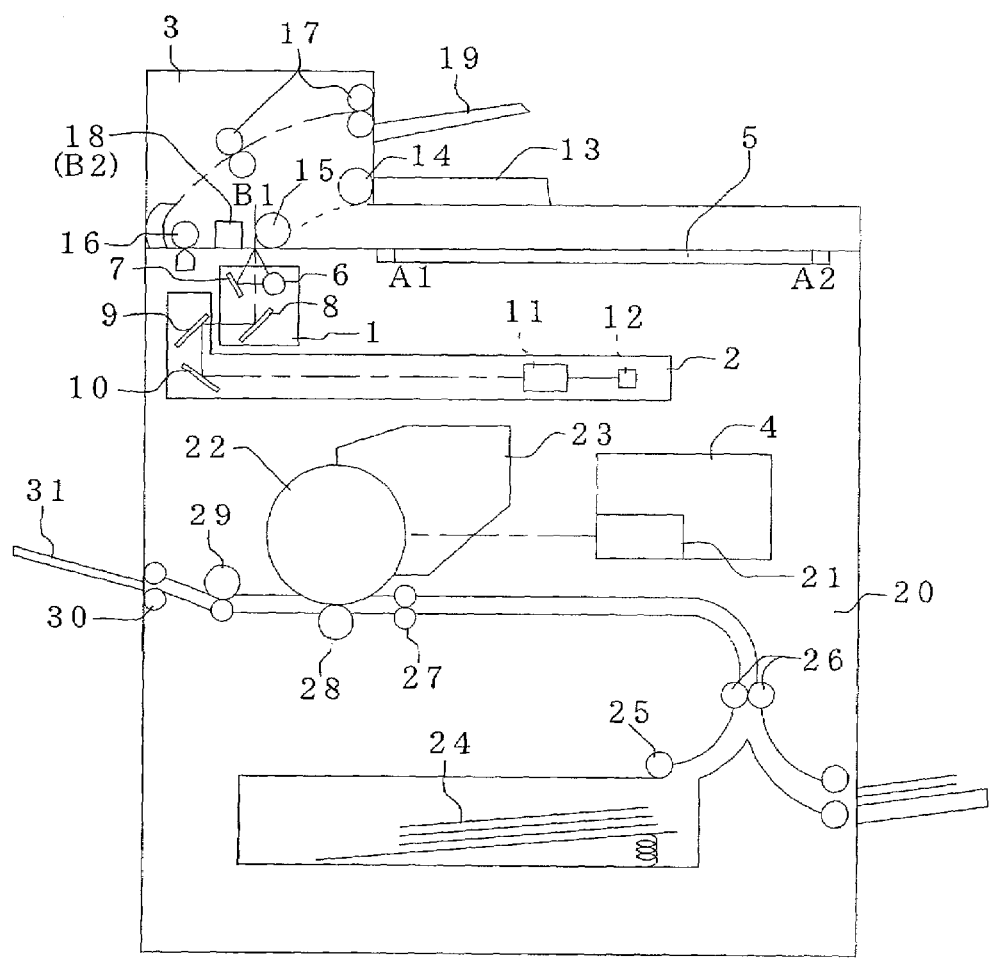
FIG. 1 is a schematic diagram of the document reading apparatus according to the present invention.

First, there will be explained the overall configuration of the document reading apparatus to which the present invention is applied with reference to FIG. 1.

A movable optical system unit 1 is made up of a light source 6 for irradiating the document sheet, a reflector 7 to reflect the light from the light source 6 so that the lightness on the document sheet face reaches a specific level and a first mirror 8 to re-reflect the light reflected on the document sheet. The movable optical system unit 1 scans the document sheet placed on a document glass 5 while moving from the reading-starting position A1 to the reading-ending position A2.

A fixed optical system unit 2 is made up of a second mirror 9, a third mirror 10, a group of lens 11 and CCD sensor 12. Through this, the light reflected on the first mirror 8 of the movable optical system unit 1 passes through the second mirror 9 and the third mirror 10 and is condensed by a group of lens 11 and then converted into an electric signal (photoelectric conversion) by CCD sensor 12 in the subsequent steps.

Furthermore, an automatic document feeder unit 3 is a mechanism for automatically conveying document sheets one by one for reading by CCD sensor 12. That is, a document sheet table 13 is used for positioning when two-side or one-side document sheets are put in place. The pick roller 14 pulls into the automatic document feeder unit 3 document sheets on the document sheet table 13 one by one. Furthermore, the document conveying rollers 15 to 17 convey through a specific path the document sheets pulled into one by one by the pick roller 14. The document sheets thus conveyed are discharged into the document discharging tray 19 and are piled up.

Here, in case the document sheet is conveyed by the automatic document feeder unit 3, images on both sides are read in the following way.

That is, the movable optical system unit 1 stands still at the first reading position B1 between the document conveying roller 15 and the document conveying roller 16, and an image on the right side (lower side) of the document sheet is read by CCD sensor 12 of the fixed optical system unit 2. Meanwhile, the contact image sensor 18 reads the back side (upper side) of the document sheet at a reading position B2 between the reading position B1 and the document conveying roller 16.

The image data converted into an electric signal by CCD sensor 12 and the contact image sensor 18 are inputted to an image processing unit 4 and is subjected to image processing as necessary (the image processing unit 4 will be described in detail later.)

Next, there will be explained the image formation unit 20. The image formation unit 20 is a mechanism for reproduction on recording paper of the image data processed by the image processing unit 4.

That is, the laser scanning unit 21 receives the image data processed by the image processing unit 4, and controls the emission of laser on the basis of that image data and scans a photosensitive drum 22. The photosensitive drum 22 forms a static latent image in the area scanned by the laser scanning unit 21. The developer 23 develops the static latent image on the photosensitive drum 22 into a visible image by sticking charged toner.

Then, the pick roller 25 pulls in sheets of recording paper one by one from the feeding paper cassette 24. The recording paper conveying roller 26 conveys to the resist roller 27 the recording paper pulled in by the pick roller 25. The resist roller 27 sends out recording papers by synthesizing with the visible image developed on the photosensitive drum 22. The transfer device 28 transfers the visible image on the photosensitive drum 22 to the recording paper sent out from the resist roller 27. The fixing device 29 heats and presses the visible image transferred on the recording paper by a transfer device 28. The paper discharge roller 30 discharges to the paper discharge tray 31 the recording paper on which the visible image is fixed by the fixing device 29.

It is noted that the component parts from the pick roller 25 to the paper discharge tray 31 are needed only when the present apparatus has a copying function. That is, in case the present apparatus is used as a scanner (in case the present apparatus is used as purely document reading apparatus), the component parts from the paper-feeding roller 25 to the paper discharge tray 31 will not be needed in particular.

Such is the overall configuration of the present document reading apparatus, but the main point of the present invention lies in the image processing unit 4. And there will be described its configuration in detail.

Embodiment 1

Figure 2:
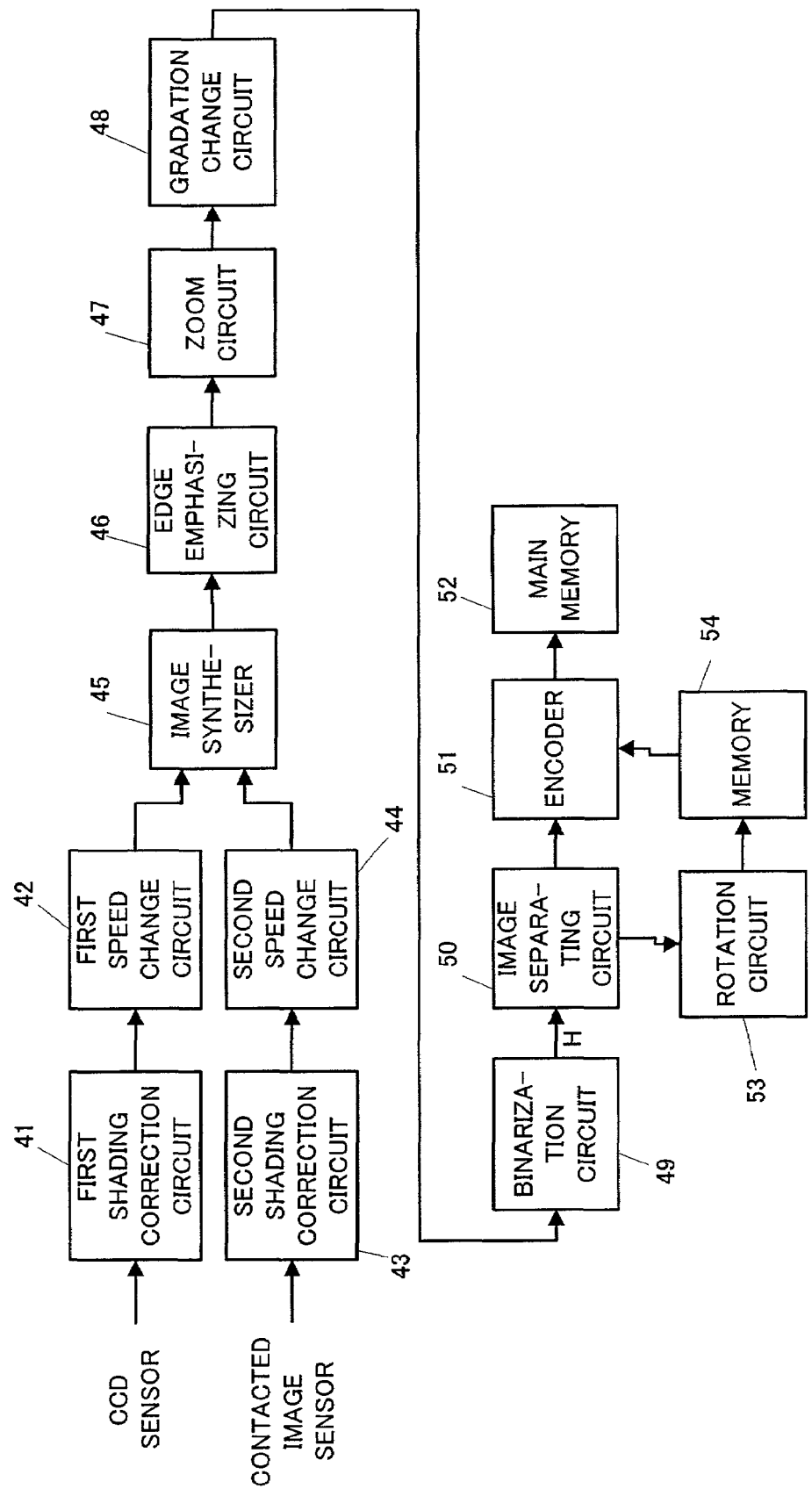
FIG. 2 is a block diagram of the image processing circuit configuration of Embodiment 1.

FIG. 2 is a block diagram of the configuration of the image processing unit 4 and there will be explained its configuration along with the operation when both sides of the document sheet are read.

First, if document sheets are set on the sheet document table 13 of the automatic document feeder unit 3, CPU (not shown) moves the movable optical system unit 1 to the reading position B1.

Then, the mode that the document is a two-side document is selected from a control panel (not shown). Furthermore, after the zoom ratio, the number of copies to be made etc. are set, and the start button is pressed. Then the pick roller 14 pulls in document sheets one by one from the document put on the sheet document table 13. Then, the document sheet pulled in by the pick roller 14 is conveyed along a specific path by the document conveying rollers 15 to 17.

Here, the movable optical system unit 1 and the fixed optical system unit 2 begin to read the right side of this document sheet when the head of the document sheet thus being conveyed reaches the reading position B1. Thereby, the image data on the right side is outputted from CCD sensor 12 to the first shading correction circuit 41.

Meanwhile, the contact image sensor 18 begins to read the reverse side of the document sheet when the head of the document sheet being conveyed as described above reaches the reading position B2. Thereby, the image data on the reverse side is outputted from the contact image sensor 18 to the second shading correction circuit 43.

Then, the first shading correction circuit 41 performs shading correction on the image data on the right side outputted by CCD sensor 12 and sends the data to the first speed change circuit 42 in the subsequent step. Hereby, the first speed change circuit 42 makes a speed change and synchronization adjustment of the image data on the right side, which will be described later, and will be sent to the image synthesizer 45.

Meanwhile, the second shading correction circuit 43 performs shading correction on the reverse side image data outputted by the contact image sensor 18 and sends the data to the second speed change circuit 44 in the next step. Hereby, the second speed change circuit 44 makes a speed change and synchronization adjustment of the image data on the reverse side, which will be described later, and will be sent to the image synthesizer 45.

Now, the operation of the first speed change circuit 42 and the second speed change circuit 44 will be explained.

Figure 3:
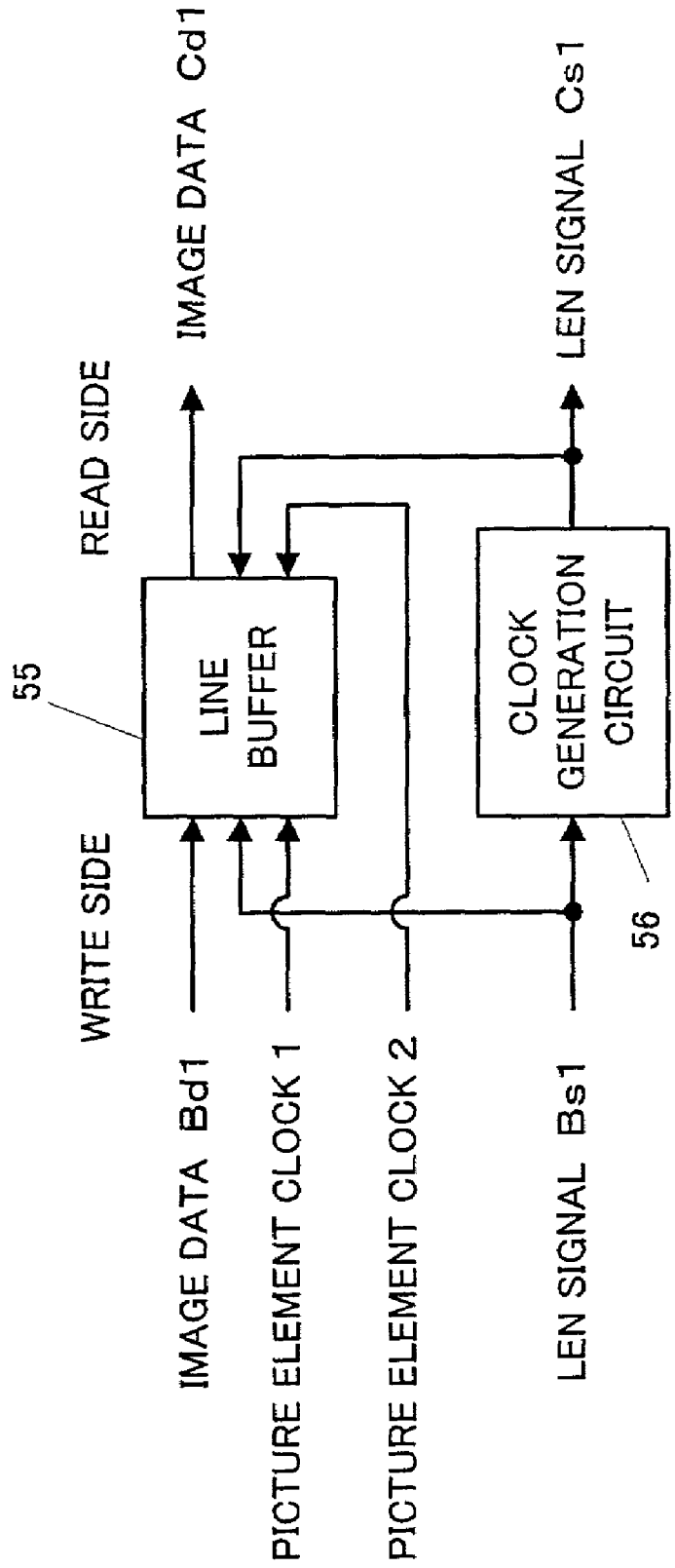
FIG. 3 is a block a diagram of a speed change circuit.

First, the first speed change circuit 42 and the second speed change circuit 44 are formed of a line buffer 55 for temporarily storing at least one line of image data and a clock generation circuit 56 for controlling the reading time from the line buffer 55 as shown in FIG. 3. And on the data-writing side (WRITE side) and on the data-reading side (READ side), this line buffer 55 has independent data buses, enabling signals that make writing or reading valid and clocks for synchronizing writing or reading.

Here, on the WRITE side, a clock is adopted which is identical in frequency with that for CCD sensor 12 and the contact image sensor 18. Meanwhile, a picture element clock that is twice as high as that the WRITE side in frequency is adopted on the READ side (all the processing circuits in this step and the subsequent steps will work on the picture element clock on the READ side.) The reason why clocks with different frequencies adopted on the WRITE side and the READ side is to make the following speed change and synchronization adjustment.

Figure 4:
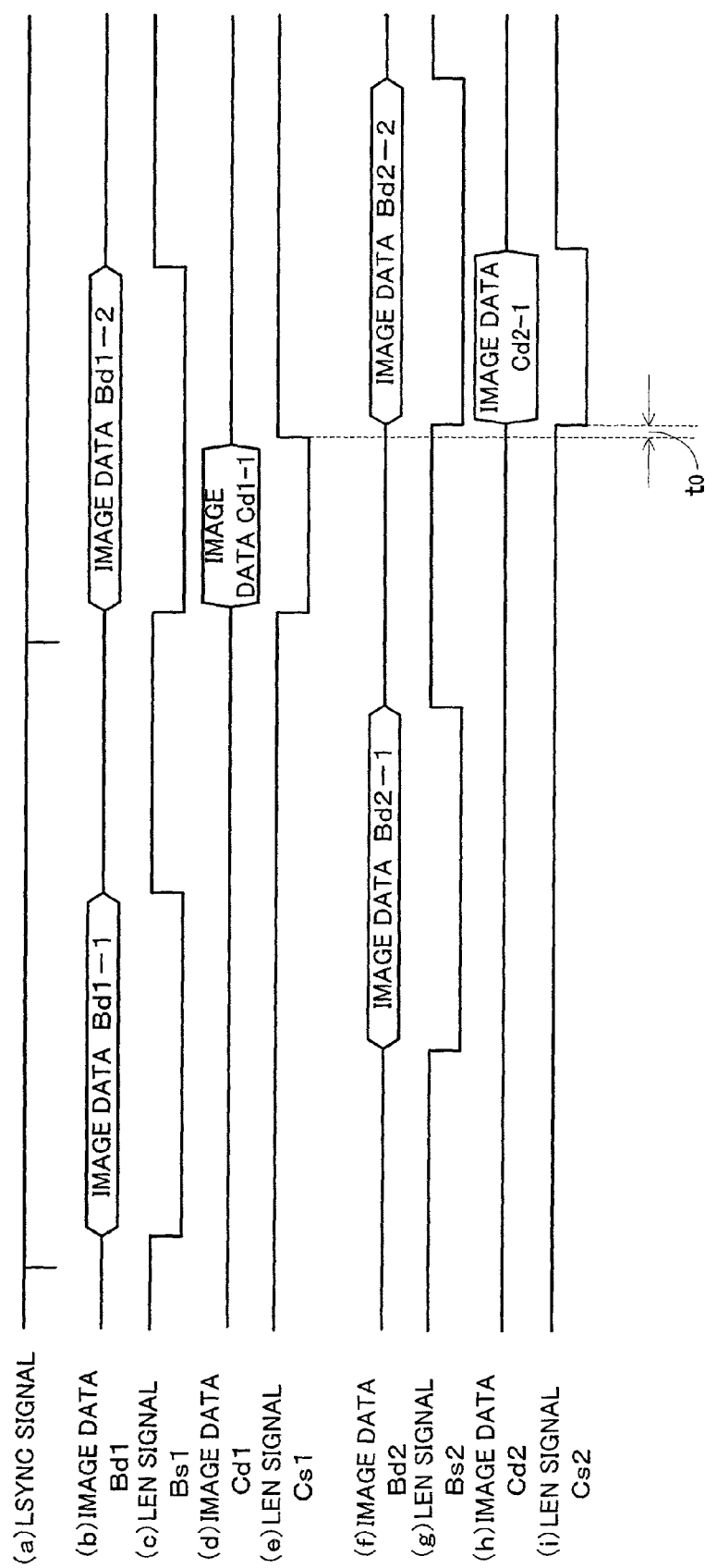
FIG. 4 is a time diagram of the speed change circuit.

First, LSYNC signal shown in FIG. 4(a) is a signal to synchronize specific circuits by lines. That is, all the processing circuits that have to be synchronized are synchronized by this LSYNC signal by lines.

LEN signal Bs1 shown in FIG. 4(c) synchronizes with the LSYNC signal and becomes valid at a specific time. And CCD sensor 12 outputs valid image data Bd1 only while this LEN signal Bs1 is valid.

Hereby, the image data Bd1 outputted from the CCD sensor 12 is written in the line buffer 55 by LEN signal Bs1 as enabling signal. That is, as shown in FIG. 4(b), only while the LEN signal Bs1 is valid, the image data Bd1 is written in the line buffer 55.

Here, the clock generation circuit 56 generates LEN signal Cs1 that becomes an enabling signal to read out image data of the preceding line which is written in the line buffer 55.

That is, the LEN signal Cs1 becomes valid only for the duration corresponding to the number of picture elements which are written in the line buffer 55. But because the frequency of the picture element clock on the READ side is twice as high as that of the picture element clock on the WRITE side, the time needed for the LEN signal Cs1 to become valid (the time needed to read data from the line buffer 55) is half the time needed for the LEN signal Bs1 to be valid (the time needed for data to be written in the line buffer 55) as shown in FIGS. 4(c) and (e).

The time for the LEN signal Cs1 to become valid (the time for reading from the line buffer 55) is so set not to be later than the time for the LEN signal Bs1 to become valid (the time for writing in the line buffer 55). That is because the line buffer 55 temporarily can memorize image data for one line, and if the reading time is behind the writing time, the image data on the line buffer 55 is overwritten by the image data on the next line.

Therefore, as shown in FIGS. 4(b) and (d), the image data Bd1-1 on the top line outputted by CCD sensor 12 is synchronized with the picture element clock with a frequency twice as high as that at the time of writing and is outputted as image data Cd1-1 before being overwritten by the image data Bd1-2 on the next line (that is, the reading-starting time is delayed by one line).

Also, image data Bd2 outputted by the contact image sensor 18 is subjected to the same speed change and synchronization adjustment as above as shown in FIGS. 4(f) to (i). But the time for the LEN signal Cs2 to become valid is when a specific number of clocks ($t_0$) pass after the LEN signal Cs1 becomes invalid as shown in FIGS. 4(e) and (i). Therefore, the time for the image data Bd2 to be outputted by the contact image sensor 18 is delayed on the basis of that.

Figure 5:
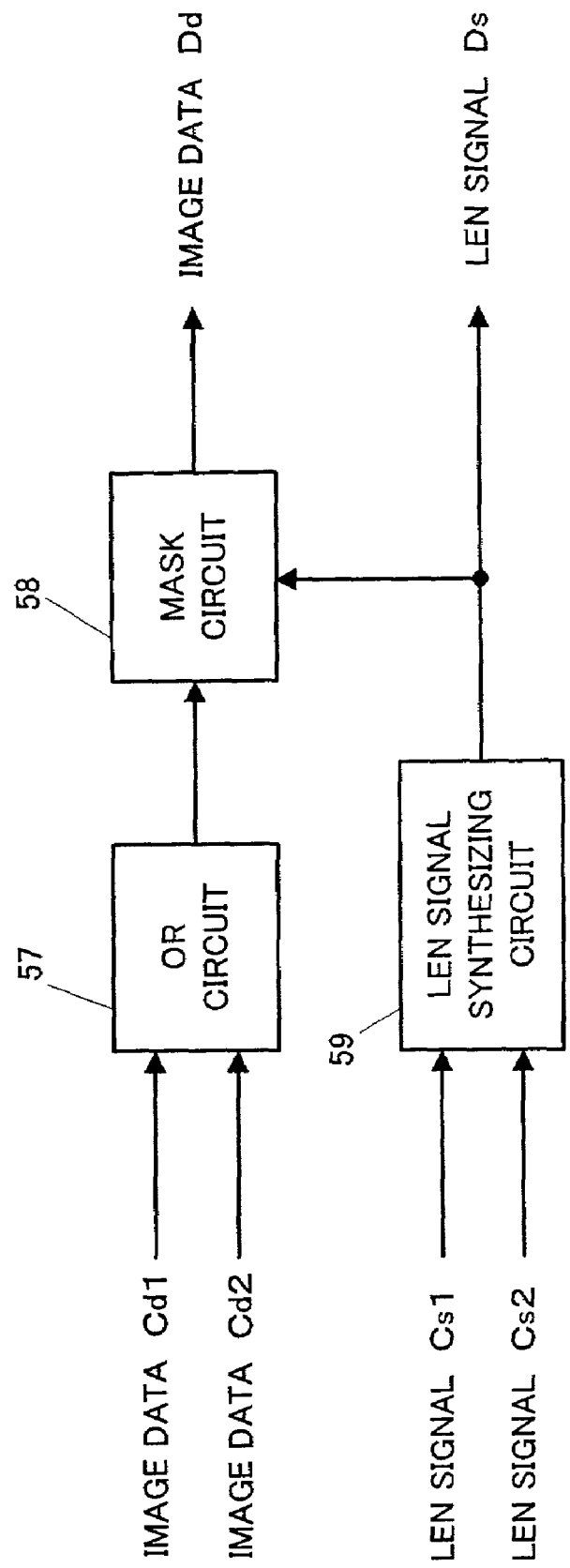
FIG. 5 is a block of an image synthesizing circuit

Image data Cd1, Cd2 of the two systems of which the synchronization is adjusted as above is input in the image synthesizer 45 which is formed of OR circuit 57, LEN signal synthesizing circuit 59 and mask circuit 58 as shown in FIG. 5, and become a pair of image data.

That is, OR circuit 57 performs OR operation on the image data Cd1 and Cd2 of two systems to be inputted. In the image data Cd1 and the image data Cd2, the scanning duration is adjusted in the main scanning direction so that the two data do not duplicate at the same as shown in FIGS. 6(b) and (d). Therefore, the two data run along one data bus at different periods of time as shown in FIG. 6(f).

Meanwhile, the LEN signal synthesizing circuit 59 synthesizes the LEN signals Cs1, Cs2 of the two systems to be inputted. But there are several clocks of invalid time ($t_0$) between the ending time of the LEN signal Cs1 and the starting time of the LEN signal Cs2 as shown in FIGS. 6(c) and (e), and therefore if OR processing is simply performed, the LEN signal of those several clocks will become invalid.

For this reason, the LEN signal synthesizing circuit 59 synthesizes the LEN signals Cs1 and Cs2 so as to be valid at the starting time of the LEN signal Cs1 and become invalid at the ending time of the LEN signal Cs2 as shown in FIG. FIGS. 6(g). This way, the image data Cd1 and C2 of two systems can be handled as a continuous pair of image data Dd as shown in FIG. 6(f).

Meanwhile, as mentioned above, document sheets are pulled in from the sheet document table 13 by the pick roller 14, moved through the path by the document conveying rollers 15 to 17 and discharged into the discharge tray. Then, the movable optical system unit 1 stands still at the reading position B1 to read the right side of the document sheet. The contact image sensor 18 to read the back side is mounted at the reading position data B2. That is, when the conveyed document sheet reaches the reading position B1, CCD sensor 12 starts the reading, and when the document sheet conveyed reaches the reading position B2, the contact image sensor 18 begins the reading.

Therefore, if the head of the document sheet reaches the reading position B1, CCD sensor 12 begins the reading, and the image data Cd1 is inputted to image processing unit 4. Then, when the head of the document sheet reaches the reading position B2, the contact image sensor 18 also begins the reading and the image data Cd2 too is inputted to image processing unit 4.

When the end of the document sheet reaches the reading position B1, CCD sensor 12 finishes reading and the image data Cd1 will not be inputted to image processing unit 4. After the end of the document sheet reaches the reading position B2, the contact image sensor 18 finishes reading, and the inputting of the image data Cd2 will be stopped the inputting.

Figure 7:
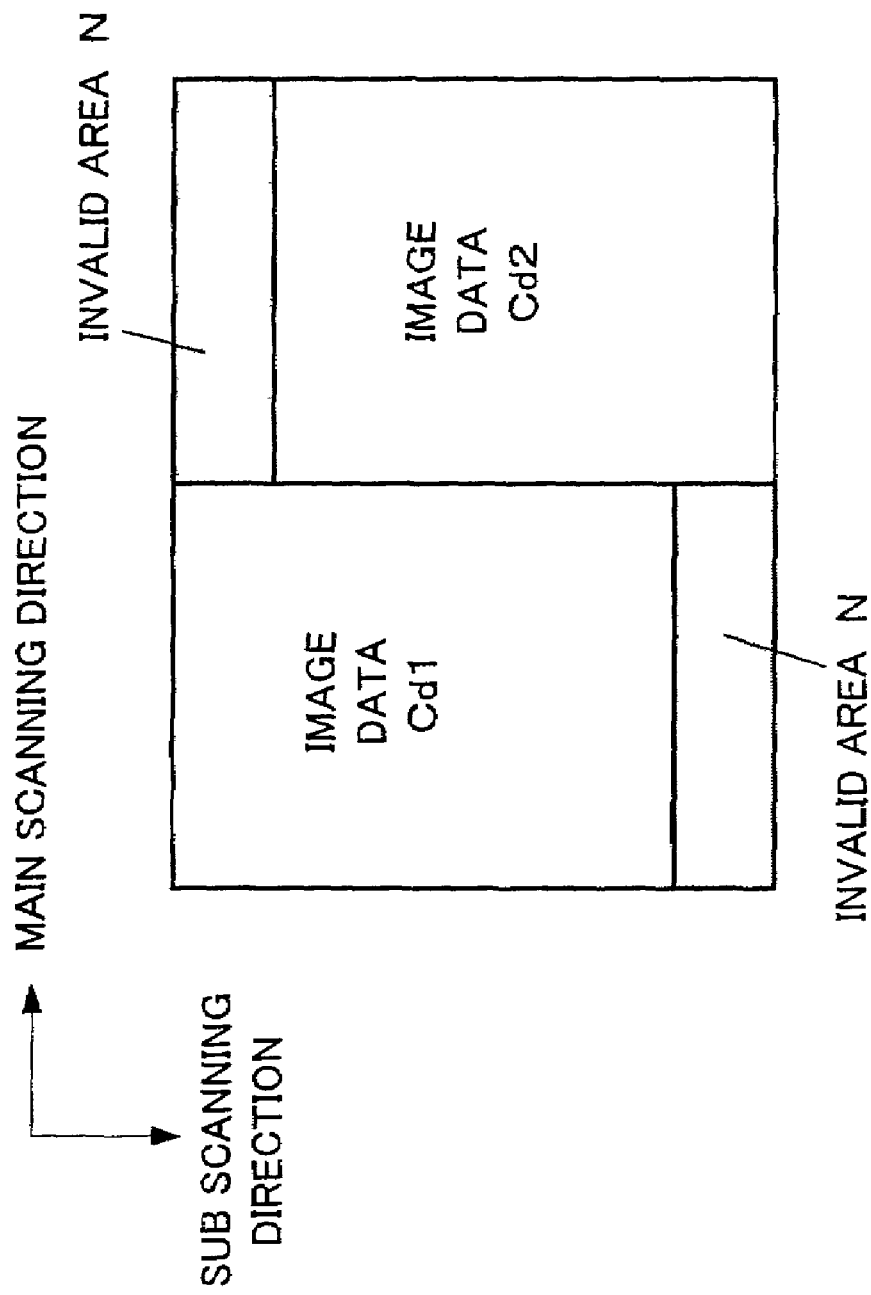
FIG. 7 is an image illustration in image synthesizing in an image synthesizing circuit.

Thus, the valid areas in the sub-scanning direction (from the starting position to the ending position) of a pair of image data Cd1 and Cd2 are differentiated by the difference between the reading position B1 and the reading position B2 as shown in FIG. 7. Therefore, there come out two invalid areas N. If some data drift into the invalid areas N, it could have an adverse effect on image processing in the subsequent step. Therefore, it is desirable to stuff the invalid area N with white data.

Finally, the mask circuit 58 masks image data from OR circuit 57 using LEN signal from LEN signal synthesizing circuit 59.

As set forth above, the image data Cd1 and Cd2 can be made into one image data Dd by passing through the image synthesizer 45. Also in case this image data Dd is separated and made into image data for two pages, that is, image data for the right side and image data for the back side, the LEN signals Cs1, Cs2 are used (which will be described later).

Specific modes of processing are performed in an edge emphasizing circuit 46, zoom circuit 47, gradation change circuit 48 and binarization circuit 49 (hereinafter all of those circuits shall be called "image processing circuits"). That is, the edge emphasizing circuit 46 performs edge emphasizing processing on image data synthesized in the image synthesizer 45. And the zoom circuit 47 performs enlargement or reduction processing on image data processed in the edge emphasizing circuit 46 as necessary. Furthermore, the gradation change circuit 48 performs gradation change processing on image data processed in the zoom circuit 47. Finally, the binarization circuit 49 performs binarization processing on image data processed in the gradation change circuit 48. The binarization is so arranged to switch between a simple binarization mode in which 1 or 0 is selected depending whether data is larger or smaller than a specific threshold value and a pseudo half tone mode like error diffusion formula to diffuse errors of binarization in surrounding picture elements.

Here, in the image processing circuits, the size of image data in the main scanning direction is about twice as the case scanning only one side and a line buffer with a capacity twice as large is needed. But the present invention is superior in cost to the prior art which is arranged to have groups of image processing circuits for two systems, one for the right side of the document sheet and the other for the reverse side.

In the image processing circuits as mentioned above, furthermore, it is desirable to adopt the following technique because image data for two systems (for two pages) are handled as a pair (one page) of image data.

In other words, there are cases where surrounding picture elements with the object picture element as center are referred to depending on the contents of image processing. Therefore, a problem that wrong data will be processed can arise if image data for two pages are placed side by side with no space left therebetween. That is, there is a possibility that when the right end of the image data Cd1 is processed, for example, the left end of the image data Cd2, that is, the data at the other page too will be referred to. In case image data for two pages are arranged side by side, therefore, white data of one picture element (preferably several picture elements) are placed therebetween. Then, since the surrounding image data are recognized as white image data, no problem as mentioned above will arise.

Figure 8:
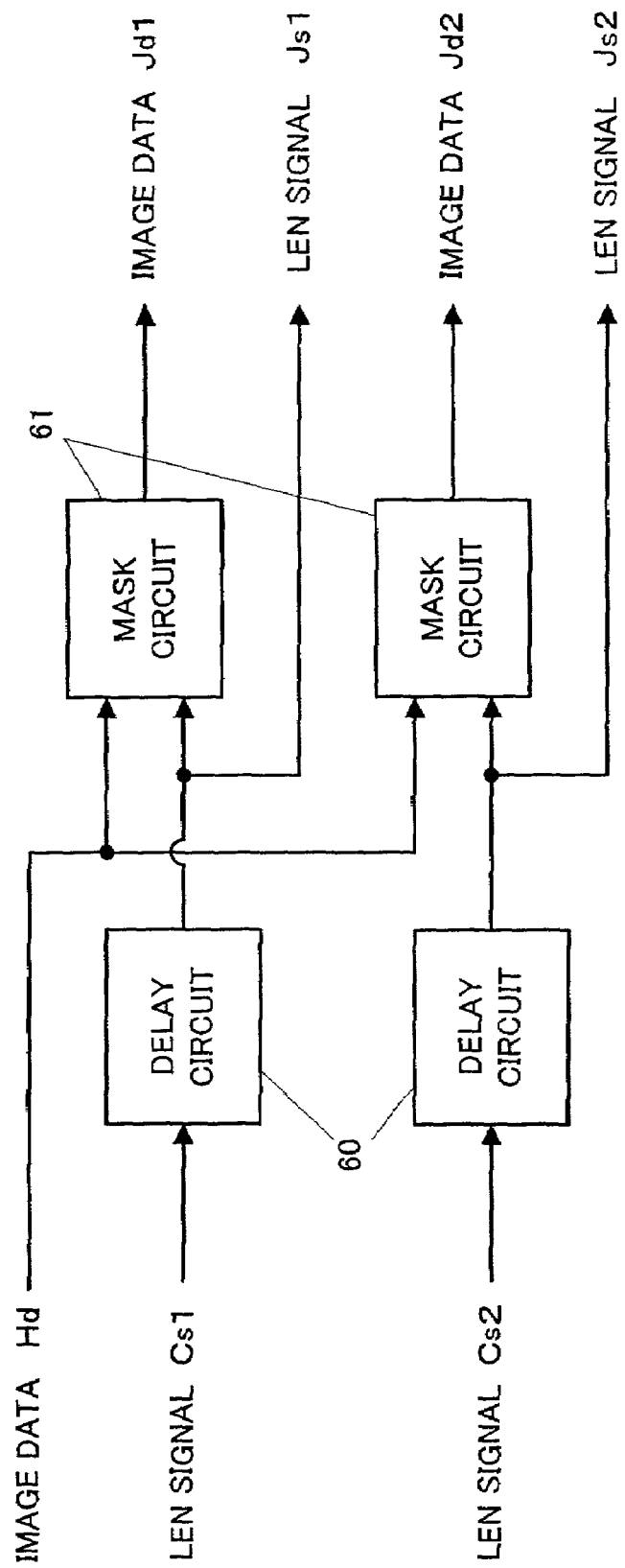
FIG. 8 is a block diagram of an image separation circuit.

Next, image data Hd which is subjected to the image processing as mentioned above is inputted in an image separating circuit 50 made up of a delay circuit 60 and a mask circuit 61 as shown in FIG. 8, where image data is separated into image data for two pages again. That is, the delay circuit 60 delays the LEN signals Cs1, Cs2 used in the image synthesizer 45 as much as the delay (which will be described later) of image data in the image processing circuits in the subsequent steps. The mask circuit 61 masks binary image data from the binarization circuit 49 with an LEN signal Js1 or Js2 from the delay circuit 60. Since image data for two pages have to be separated here, two delay circuits 60 and two mask circuits 61 as described above are each provided.

There will be described the image separating circuit 50 in more detail with reference to FIG. 9.

Figure 9:
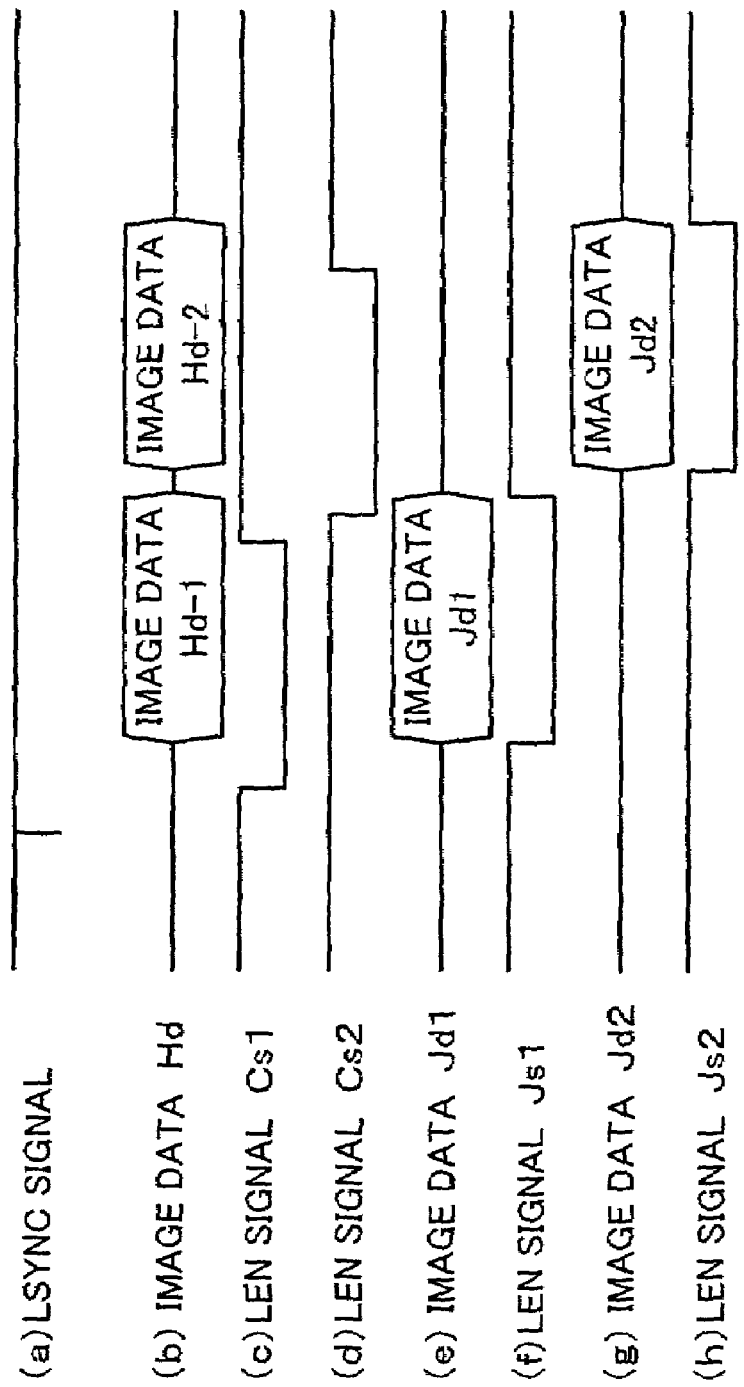
FIG. 9 is a time chart of an image separation circuit.

First, as shown in FIG. 9(*b*), image data Hd for two pages is inputted with a specific time synchronized with LSYNC signal. At the same time, LEN signals Cs1, Cs2 used in the image synthesizer 45 in the preceding step are also inputted as shown in FIGS. 9(*c*) and (*d*).

Here, the image data Hd is somewhat delayed by the image data processing circuits in the preceding steps such as the edge emphasizing circuit 46 and the zoom circuit 47, and the amount of delay image data is determined by the configuration of the image processing circuit. Therefore, the delay circuit 60 delays the LEN signal Cs1 and the LEN signal Cs2 unconditionally by the duration corresponding to a specific number of picture elements. That is, the LEN signal Cs1 becomes an LEN signal Js1 which is valid only while image data Hd-1 is inputted into the image separating circuit 50 as shown in FIG. 9(*f*). And the LEN signal Cs2 becomes an LEN signal Js2 which is valid only while image data Hd-2 is inputted into the image separating circuit 50 as shown in FIG. 9(*h*).

Meanwhile, the mask circuit 61 outputs image data in only the area where the LEN signal Js1 or the LEN signal Js2 inputted at the same time as image data is valid, and outputs white data in the invalid area. That is, as shown in FIG. 9(*b*), image data Hd for two pages is inputted, and at the same time the LEN signal Js1 or Js2 from the delay circuit 60 is inputted as shown in FIGS. 9(*f*) and (*h*). Each of LEN signal Js1, Js2 is such an LEN signal in which the area for one page only become valid. From the mask circuit 61, therefore, image data Jd1, Jd2 for one page will be outputted as shown in FIGS. 9(*e*) and (*g*).

And the image separating circuit 50 sends to encoder 51 image data (right side image data) Jd1, one of the two data produced from separation, and the other image data (image data on the back side) Jd2 to the rotation circuit 53.

Figure 10:
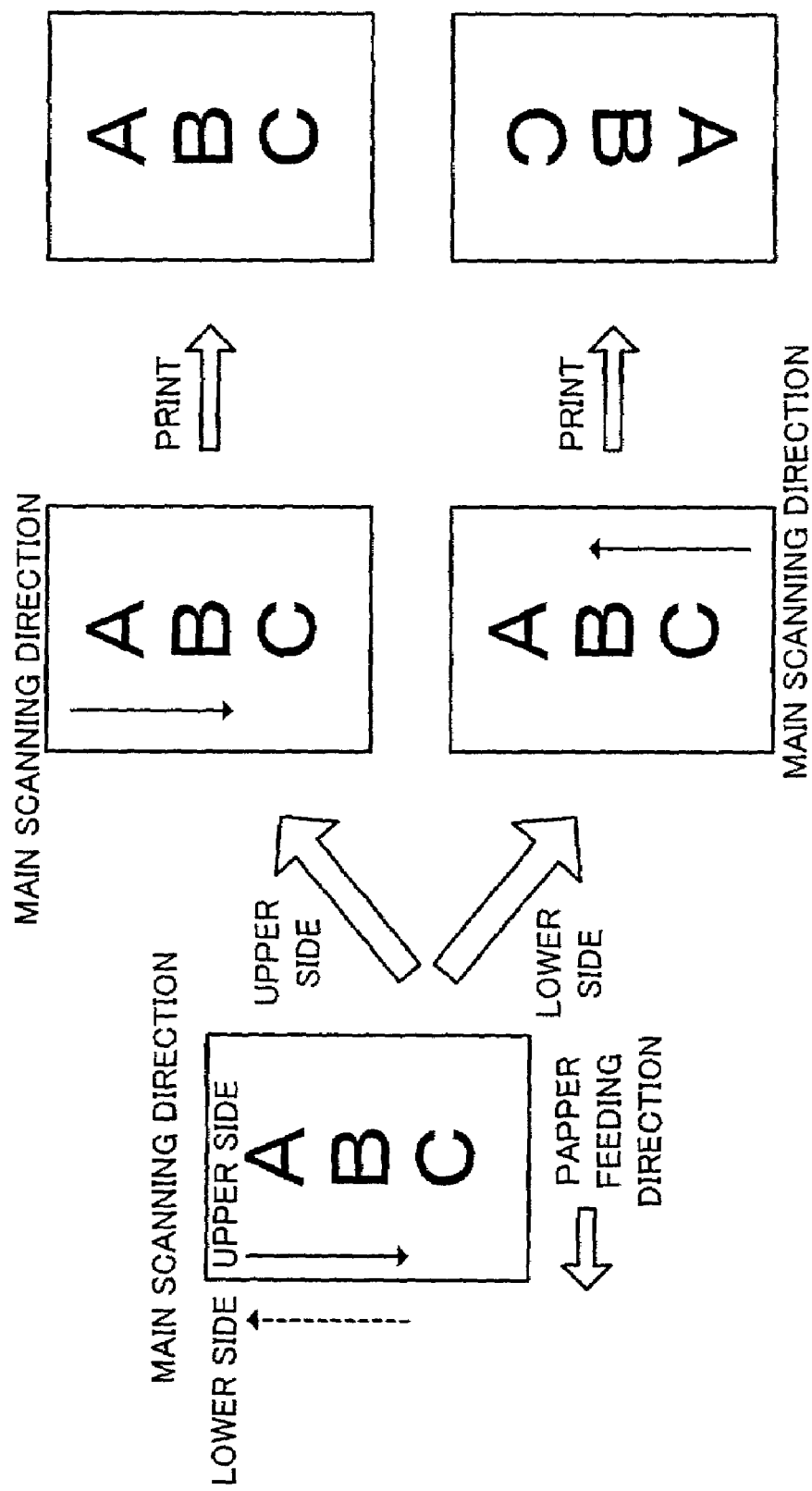
FIG. 10 is a diagram illustrating the direction of image data at the time of reading the two sides of a document sheet.

Here, the image data Jd1 and the image data Jd2 are turned 180° in relation to each other as shown in FIG. 10. That is because CCD sensor 12 reads the lower side of the document sheet from the point nearest CCD sensor 12 toward the head of the document sheet conveying direction, while the contact image sensor 18 reads from the head of the point nearest CCD sensor 12 in the document sheet conveying direction.

Therefore, the image data Jd1 is encoded (compressed) real-time by encoder 51 and forwarded to a main memory 52, while the image data Jd2 is turned 180° by a rotation circuit 53 and temporarily stored in memory 54. The process of writing the image data Jd1 in the main memory 52 through encoder 51 as just described is performed at the same time as the process of writing image data Jd2 in memory 54 through the rotation circuit 53.

Then, after image data Jd1 is forwarded to the main memory 52, the image data Jd2 in the memory 54 is encoded by encoder 51 and forwarded to the main memory 52. Since there is no need to line synchronize as in case of reading, the image data Jd2 is forwarded from the memory 54 to encoder 51, the main memory 52 at the maximum speed.

It is noted that the forwarding of the image data Jd2 has to be completed before the next document sheet is conveyed. Therefore, while the forwarding has not been finished, the reading of the document sheet is awaited.

Finally, the image data thus forwarded are stored in the main memory 52 one after another, two-side reading of a series of document sheets is completed.

As set forth above, the present invention can provide a document reading apparatus that permits reading both sides of the document sheet at the same time without reducing the document reading speed and expanding the image processing circuits. Needless to say, the present document reading apparatus is also provided with a function of reading one side of the sheet document, and the operation of the one side reading function will be explained with emphasis on its differences from the two side reading.

First, the document sheets are set the reading side downward on the sheet document table 13. And the mode that the document sheets are one-sided sheet is selected from an operation panel (not shown) and the start button is pressed. Then, the document sheets set on the sheet document table 13 are pulled in one by one by the pick roller 14. The document sheets thus pulled in are conveyed along a specific path on the document conveying rollers 15 to 17.

Here when the document sheets are set on the sheet document table 13, the movable optical system unit 1 stands still at the reading position B1.

Figure 11:
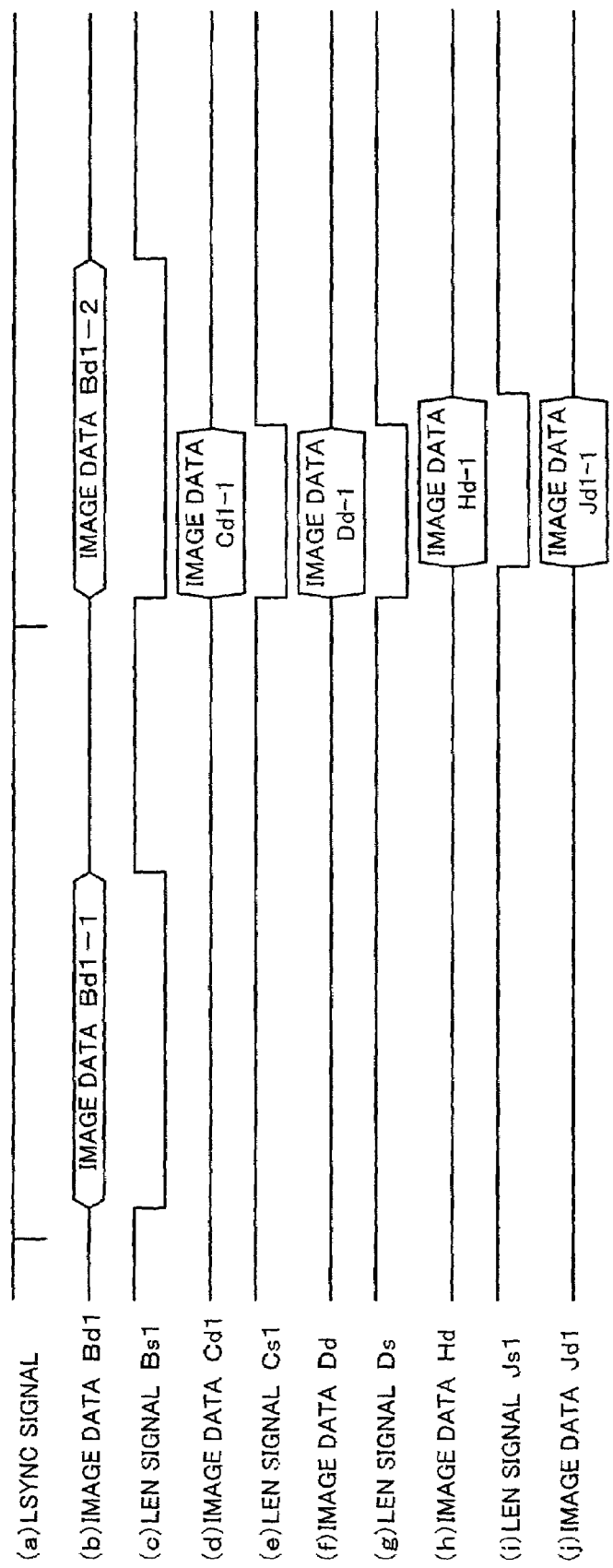
FIG. 11 is a time chart at the time of reading one side of the document sheet.

And when the document sheet is conveyed up to the reading position B1, the movable optical system unit 1 and the fixed optical system unit 2 are actuated so that CCD sensor 12 reads the right side of the document sheet. And the image data thus read is subjected to shading correction in the first shading correction circuit 41 and then inputted in the first speed change circuit 42. Then, the first speed change circuit 42 performs a speed change and synchronization adjustment shown in FIG. 11. In other words, in case only one side of the document sheet is read, the contact image sensor 18 is not actuated, and the second shading correction circuit 43 and the second speed change circuit 44 do not work, either. Therefore, the image synthesizer 45 outputs the output of the first speed change circuit 42 as it is.

After that, the document sheet is subjected to processing at the edge emphasizing circuit 46, the zoom circuit 47, the gradation change circuit 48 and the binarization circuit 49 in the subsequent steps, and image data Hd is sent to the image separating circuit 50 as in case of two-side reading.

It was explained that here in case image data for two pages are inputted, the image separating circuit 50 separates that image data into two image data, each for one page. However, when image data for only one page are inputted, there is no need to separate the data. The image separating circuit 50 which receives one-page image data outputs the image data to encoder 51 and outputs nothing to the rotation circuit 53.

Then, encoder 51 encodes image data (that is, only one document sheet that is running at this moment) outputted by the image separating circuit 50 and forwards the data to the main memory 52. And image data thus obtained are stored in the main memory 52 one after another, and one-side reading of a series of document sheets is completed.

As set forth above, the document reading apparatus according to the present invention has a function of reading two sides of the sheet document but also a function of reading one side of the sheet document.

The reading of one side of the document sheets using the automatic document feeder unit 3 has been described, but the present invention is not limited to that. In case reading documents of an irregular form such as books and such documents as thick paper that can not be conveyed by the automatic document feeder unit 3, one side can be read by placing the document directly on the document glass 5.

That is, the document is placed on the document glass 5 the reading side downward, the automatic document feeder unit 3 is closed and the start button is pressed (in this case, the automatic document feeder unit 3 serves to press the document on the document glass 5). If the start button is pressed with no document sheet set on the automatic document feeder unit 3, CPU (not shown) judges that a document is placed on the document glass 5. And while the movable optical system unit 1 is moved from the reading-starting position A1 to the reading-ending position A2, the image on the sheet document is read and converted into image data by CCD sensor 12. The subsequent operation is the same as that when the automatic document feeder unit 3 is used, and will not be explained.

In the above description, there was shown an arrangement in which one CCD sensor 12 and one contact image sensor 18 are used, but the present invention is not limited to that. That is, either of CCD sensor 12 or the contact image sensor 18 only may be used as image sensor to read the document sheet. In that case, too, the circuits for processing the image data after reading are identical in configuration.

Figure 12:
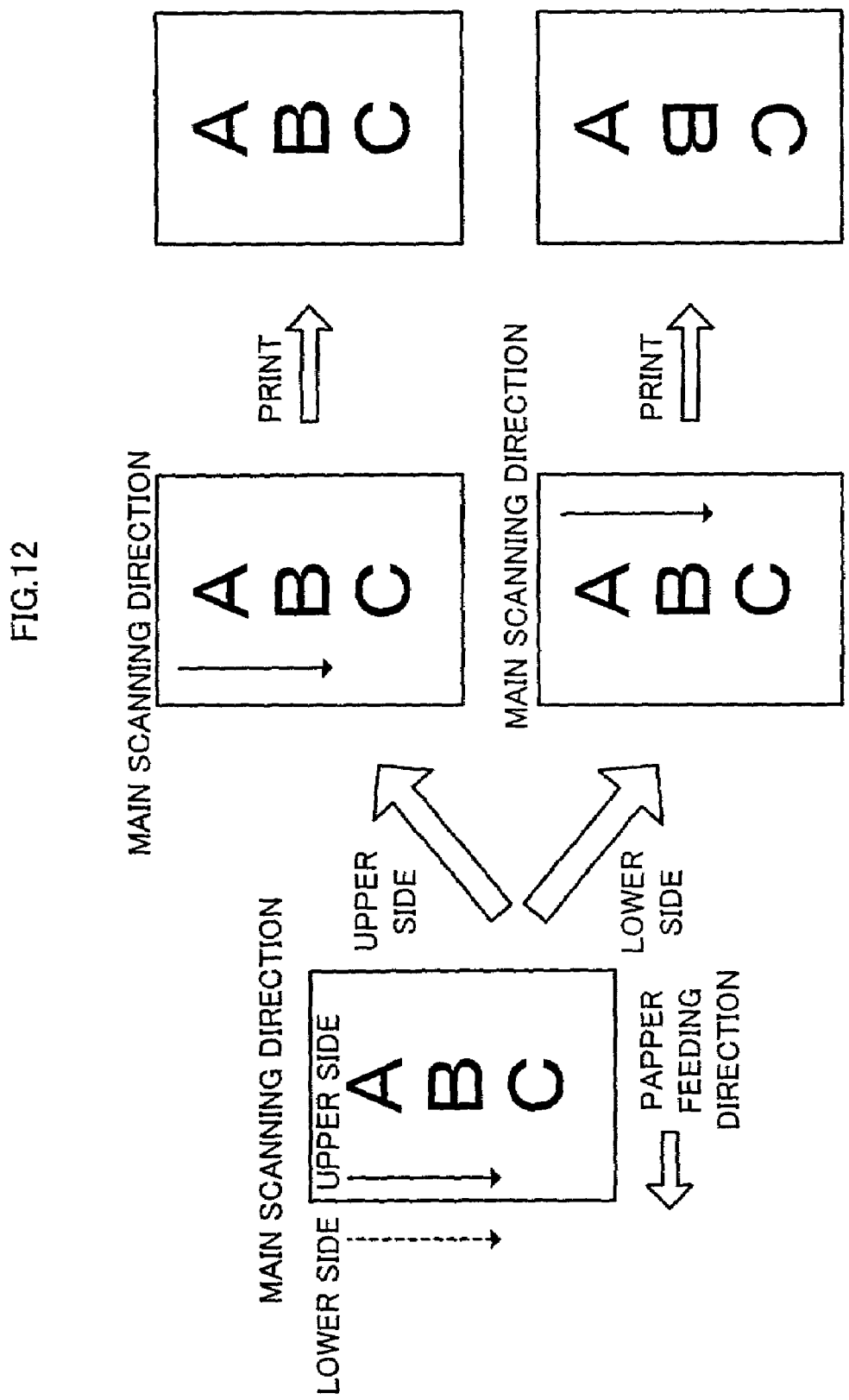
FIG. 12 is a diagram illustrating the direction of image data in case the reading directions of the upper and lower image sensors are the same.

In the above description, furthermore, there is shown an example in which the direction of reading the upper side by scanning (CCD sensor 12) is opposite to the direction of reading the lower side by scanning (the contact image sensor 18), but the present invention is not limited to that. In other words, if the upper sensor and the lower sensor are identical in the main scanning reading direction, the two image data read are images not turned 180° in relation to each other but are mirror images as shown in FIG. 12. In this case, therefore, there is provided a mirror image processing circuit instead of the rotation circuit 53. The mirror image processing circuit is well known, and will not be explained.

Also in the above description, the read multi-valued data is binarized, encoded and stored in the main memory 52, but the present invention is not limited to that. That is, as long as arrangements are so made that image data is stored in the main memory 52, the same results as above can be obtained. For example, two-valued data may be read and stored in the main memory 52 as they are, or multi-valued image data is put to multi-value compression and stored in the main memory 52. If the system is so arranged that multi-valued image data are stored in the main memory 52 as they are, a high picture quality digital copying machine can be formed by combining a printer unit where multi-valued data can be printed.

Embodiment 2

Figure 13:
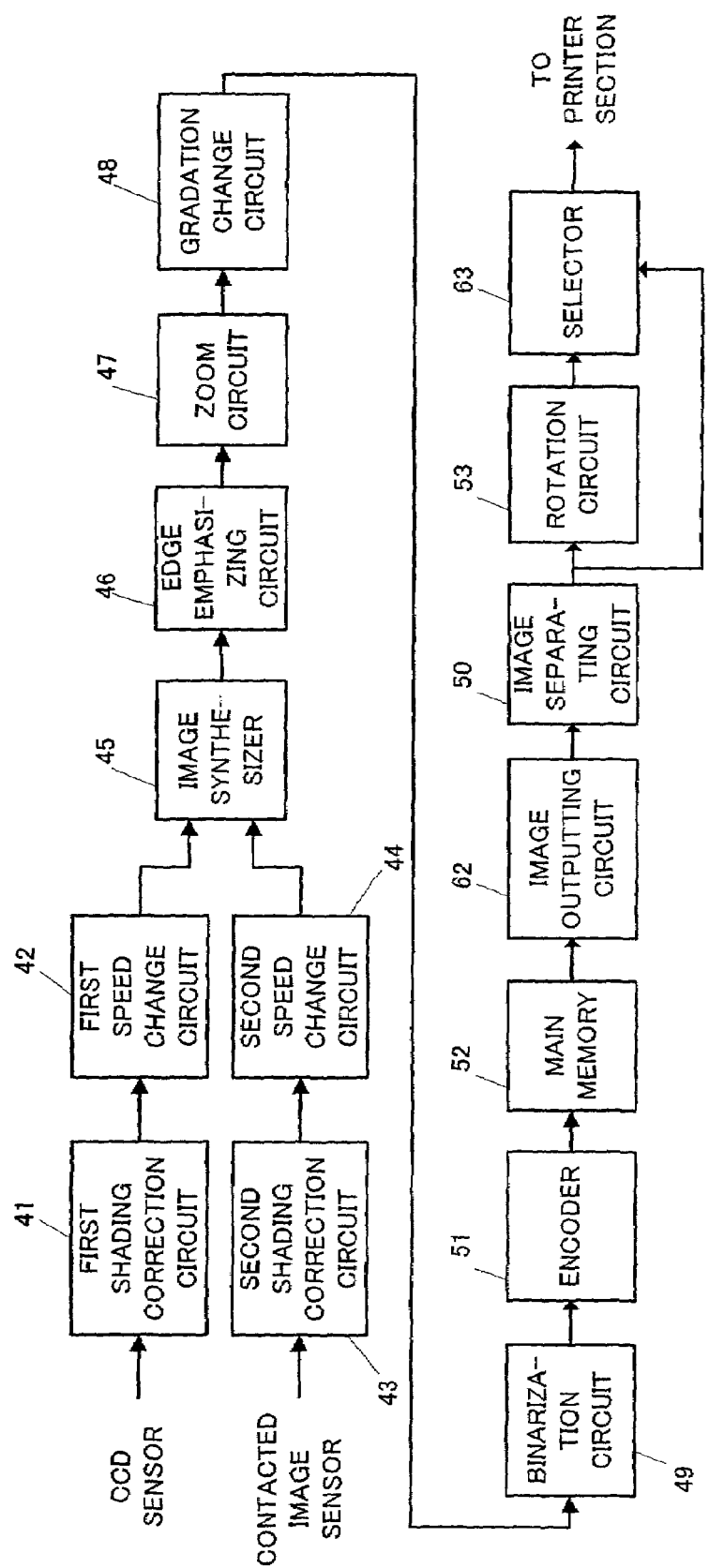
FIG. 13 is a block diagram of the image processing circuit configuration in Embodiment 2.

FIG. 13 is a block diagram of the image processing circuit configuration in Embodiment 2. There will be described the configuration with the description limited to what the present embodiment is different from Embodiment 1.

First, encoder 51 which receives two-valued data from the binarization circuit 49 encodes the two-valued data and transfers the data to the main memory 52. That is, the main memory 52 temporarily stores the encoded two-valued image data.

Then, the image outputting circuit 62 selects and reads one of compressed image data stored in the main memory 52, decompresses and refers the data to the image separating circuit 50. Thereby, the image separating circuit 50 separates image data for two pages decompressed in the image outputting circuit 62 and outputs one of them. Furthermore, image data selected in the image separating circuit 50 is turned 180° by the rotation circuit 53.

Here, the selector 63 selects one between image data outputted by the image separating circuit 50 and image data outputted by the rotation circuit 53 and outputs the data. This way, it is possible to select whether the rotation of the image data selected by the image separating circuit 50 is needed or not. That is, arrangements are so made that in case the image data selected by the image separating circuit 50 needs to be rotated, the selector 63 selects the image data outputted by the rotation circuit 53 and that in case the image data selected by the image separating circuit 50 needs not be rotated, the selector 63 selects the image data outputted by the image separating circuit 50.

Now, the configuration of the document reading apparatus will be explained along with the document reading operation in more detail.

First, document sheets are set on the sheet document table 13. After images on the two sides are read by CCD sensor 12 and the contact image sensor 18, those image data are synthesized and subjected to image processing. The process up to that point is the same as that in Embodiment 1.

After that, binarized image data is encoded by encoder 51 and forwarded to the main memory 52. Since such encoded image data are image data with the simultaneously read right and back sides put side by side, compressed image data for two pages are temporarily stored in the main memory 52.

Here, CPU (not shown) selects one page as object for printing from image data for two pages stored in the main memory 52. In this connection, which page to select as object for printing is determined by CPU on the basis of the printing number set from an operation panel (not shown), electronic sort etc.

Next, the image outputting circuit 62 reads from the main memory 52 the image data containing the page selected by CPU, decompresses the image data for two pages and outputs the data to the image separating circuit 50. And the image separating circuit 50 outputs image data for only one page selected by CPU out of image data for two pages decompressed by the image reading out circuit 62. The other page not selected is masked here.

Furthermore, image data outputted by the image separating circuit 50 as mentioned above is sent to the rotation circuit 53 and the selector 63 in the subsequent steps. And the rotation circuit 53 turns image data from the image separating circuit 50 by 180° and outputs the data to the selector 63.

Here, the selector 63 outputs only image data selected by CPU out of the image data outputted by the image separating circuit 50 and the image data outputted by the rotation circuit 53. That is, in case the page selected by CPU corresponds to data on the right side, the selector 63 outputs image data from the image separating circuit 50 and in case the page selected by CPU corresponds to image data on the back side, the selector 63 outputs image data from the rotation circuit 53.

And the image data outputted by the selector 63 as mentioned above is inputted into a printer unit, and an image is formed by the printer unit and printed on recording paper.

As set forth above, the same results as in Embodiment 1 can be obtained in the present embodiment. That is, two sides of the document sheet can be read simultaneously without reduction in document reading speed and expansion of image processing circuits. Needless to say, there are provided a function of reading two sides of the document sheet but also a function of reading one side.

Embodiment 3

In Embodiment 1 and Embodiment 2, examples were described in which CCD sensor 12 and the contact image sensor 18 as image sensor. However, CCD sensor 12 and the contact image sensor 18 are different in electrical characteristics, and image data read are different in signal level and dynamic range. Therefore, if the same image processing is performed on image data read by CCD sensor 12 and the contact image sensor 18, the image data on the right side is different from image data on the back side in picture quality. In the present embodiment, the following configuration is adopted to bring the right side and the back side closer in picture quality.

Figure 14:
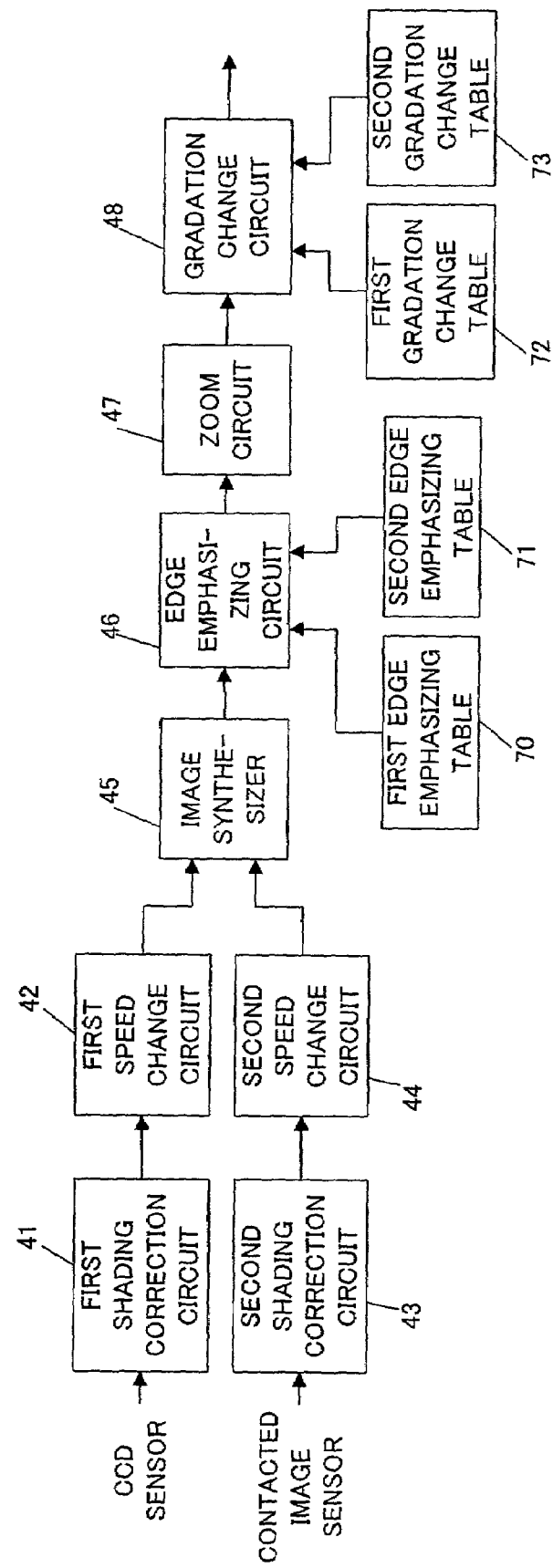
FIG. 14 is a block diagram of the image processing circuit configuration in Embodiment 3.
Figure 15:
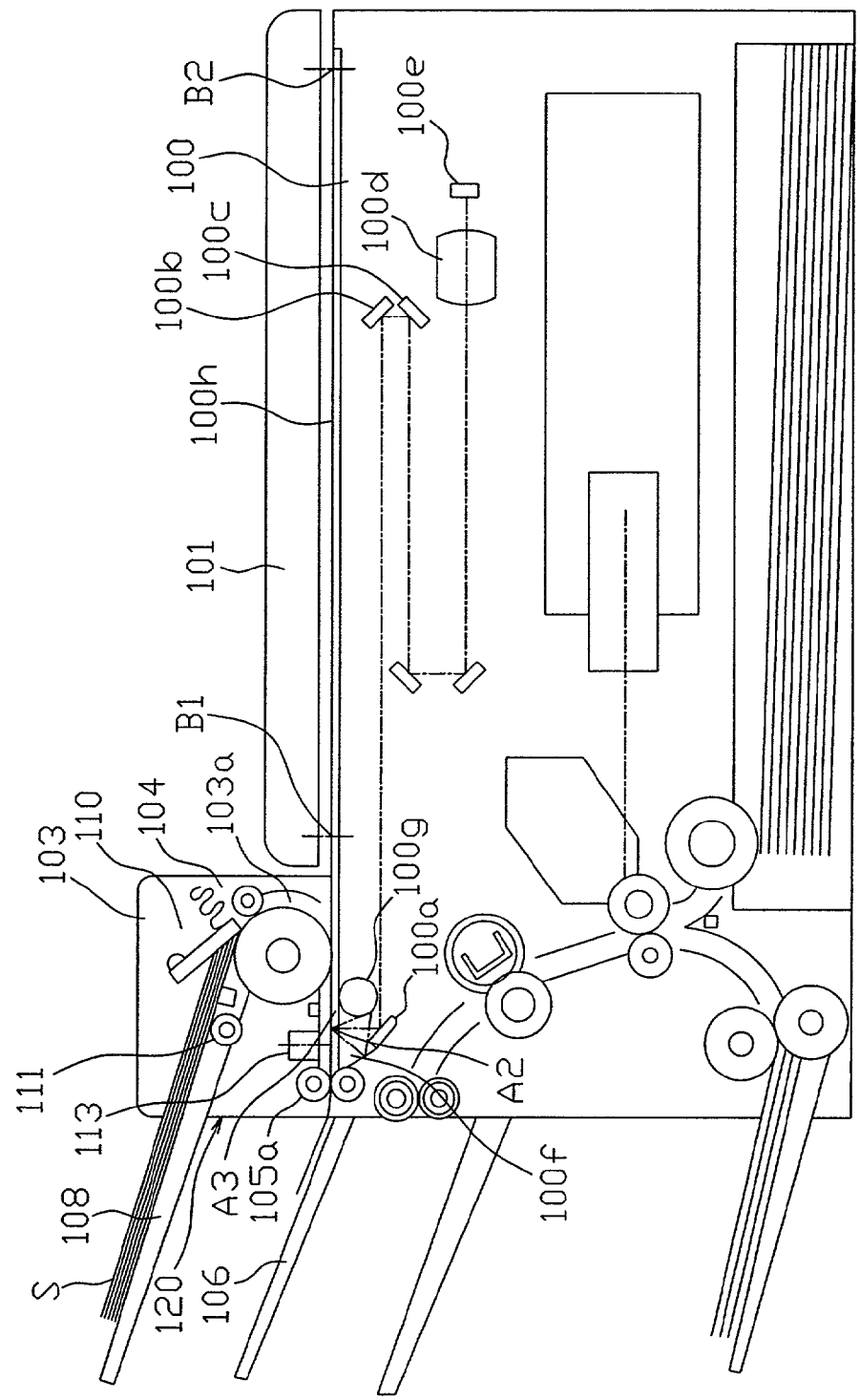
FIG. 15 is a schematic diagram of a prior art document reading apparatus.
Figure 16:
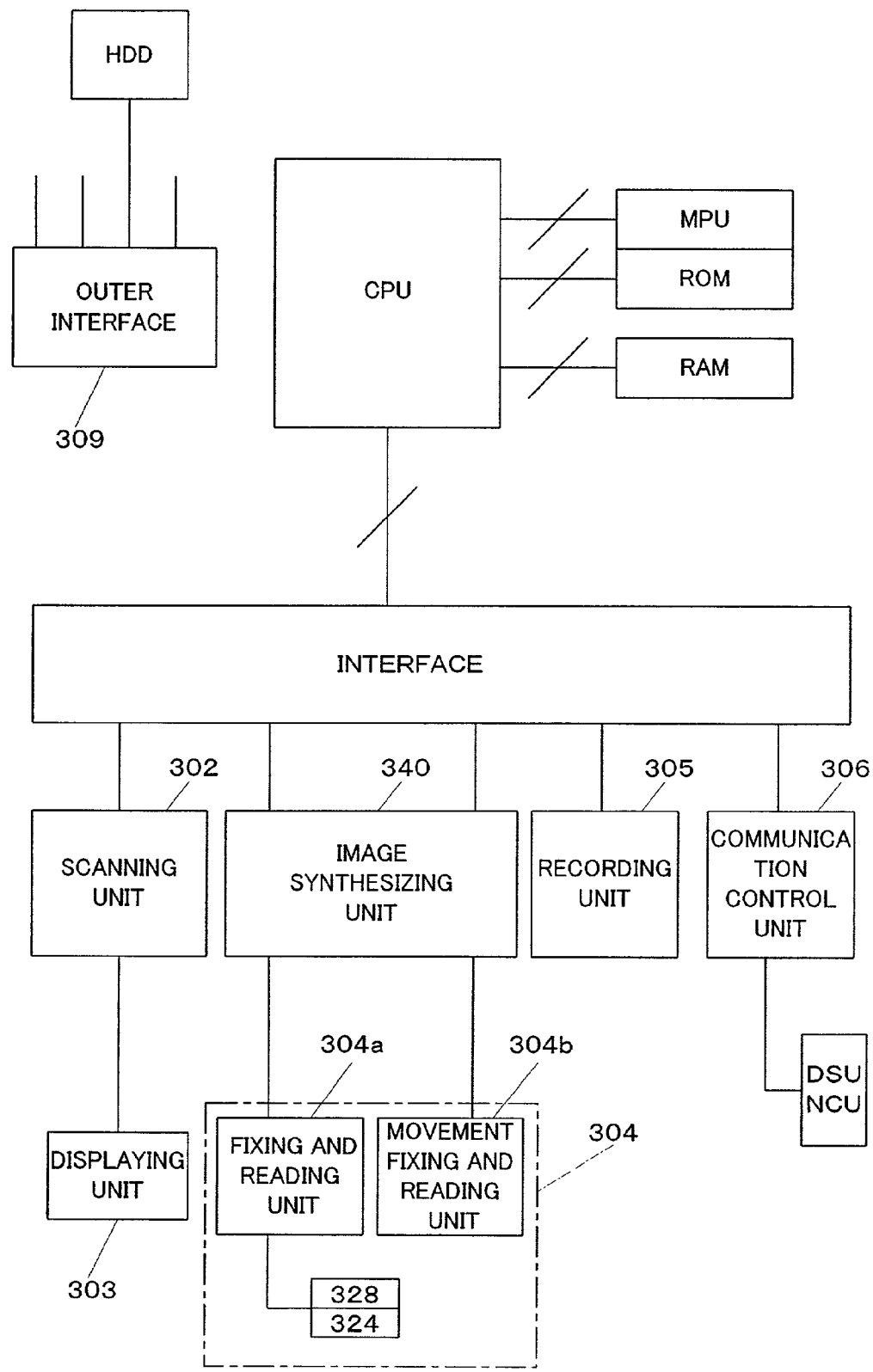
FIG.16 is a block diagram of the overall control system of the prior art document reading apparatus.

That is, the image processing unit 4 in the present embodiment is provided with a first edge emphasizing table 70, a second edge emphasizing table 71, a first gradation change table 72, and a second gradation change table 73 as shown in FIG. 14.

The first edge emphasizing table 70 and the second edge emphasizing table 71 are identical in table size but different only in data set therein. That is, table data suitable for the characteristics of CCD sensor 12 are set in the first edge emphasizing table 70, while table data suitable for the characteristics of the contact image sensor 18 are set in the second edge emphasizing table 71.

And the edge emphasizing circuit 46 processes part corresponding to the image data read by CCD sensor 12 using the first edge emphasizing table 70 and part corresponding to the image data read by the contact image sensor 18 using the second edge emphasizing table 71.

Figure 6:
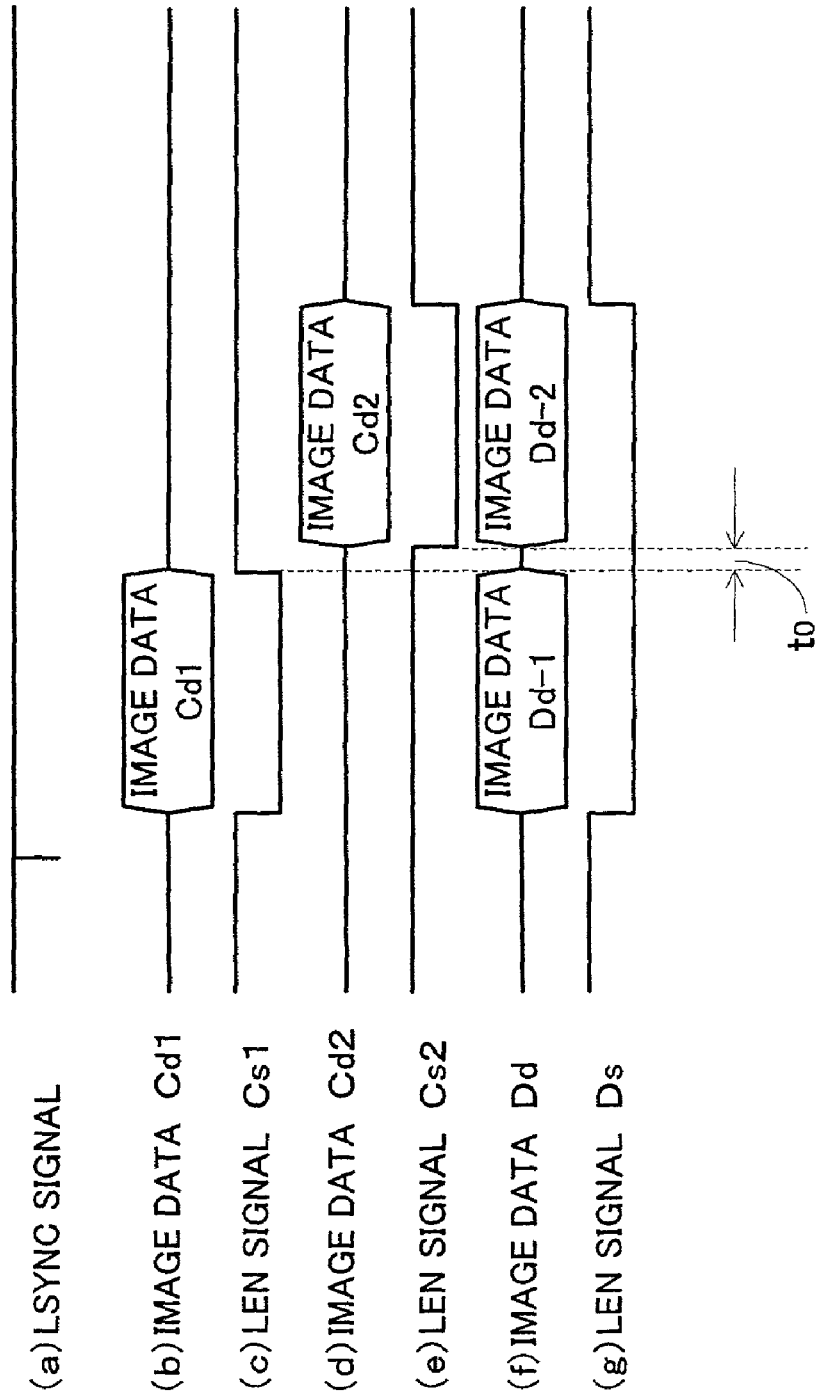
FIG. 6 is a time chart of an image synthesizing circuit.

That is, image data Dd made up of image data Dd1-1 and image data Dd-2 as shown in FIG. 6 are inputted in the edge emphasizing circuit 46. And this data D-1 is processed using the table data set in the first edge emphasizing table 70, while image data Dd-2 is processed using table data set in the second edge emphasizing table 71. Which table to use, table 70 or 71, is set in the edge emphasizing circuit 46 in advance and switchover can be made at any time.

The same is the case with gradation changing.

That is, table data suitable for the characteristics of CCD sensor 12 is set in the first gradation change table 72, while table data suitable for the characteristics of the contact image sensor 18 is set in the second gradation change table 73. And in the gradation change circuit 48, part corresponding to image data read by CCD sensor 12 is processed using the first gradation change table 72, while part corresponding to image data read by the contact image sensor 18 is processed using the second gradation change table 73.

The subsequent process is the same as in Embodiment 1 and Embodiment 2 and will not be explained.

In the present embodiment, as set forth above, in case the image sensor to read the right side of the document sheet is different from that to read the back side of the document sheet as CCD sensor 12 and the contact image sensor 18, the image data on different sides are processed using the different tables suitable for the respective characteristics. This way, image data on the two sides can be brought closer in characteristics, thereby eliminating the problem that the right side and the back side are different in picture quality.

In this embodiment, table data are switched over to perform image processing suitable for the characteristics. The same results can be obtained by providing operation coefficients suitable for the characteristics and by switching over from one coefficient to another.

As shown, images on the two sides of the document sheet can be read at the same time and those image data can be processed simultaneously according to the present invention. In addition to the advantage that the document sheets will not be damaged, high speed reading (twice as high as usual reading) can be achieved.

Furthermore, in case copying is done in combination with an image formation apparatus such as a printer, copies can be made by this printer at the maximum speed (generally, document reading speed is higher than the maximum speed of the printer).

In addition, the present document reading apparatus can be used as remote scanner if connected with, for example, a personal computer through the network. In this case, too, if the forwarding speed is high enough, the scanner can be operated at the maximum speed and the document can be read at a speed twice as high as the usual speed.

The invention claimed is:

1. A document reading apparatus for reading both sides of a document sheet by two image reading units at an equal reading speed, said apparatus comprising:
   a first image reading unit for reading one side of the document sheet;
   a second image reading unit for reading another side of the document sheet;
   a first speed changing unit for writing into a line buffer the image data read by the first image reading unit at the same speed as the reading speed of the first image reading unit, and reading the image data from the line buffer at double the reading speed;
   a second speed changing unit for writing into another line buffer the image data read by the second image reading unit at the same speed as the reading speed of the second image reading unit, and reading the image data from the line buffer at double the reading speed; and
   an image synthesizing unit for synthesizing a first image data from the first speed changing unit and a second image data from the second speed changing unit in a main scanning period of one of the two image reading units.

2. The document reading apparatus of claim 1 wherein said image synthesizing unit synthesizes the first image data from the first speed changing unit and the second image data from the second speed changing unit by placing the first and second image data side by side in the main scanning period of one of the two image reading units.

3. The document reading apparatus of claim 1 which further comprises an image processing unit for performing a specific mode of processing on image data from said image synthesizing unit in the main scanning period.

4. The document reading apparatus of claim 1, wherein said first image reading unit and said second image reading unit have the same main scanning cycle, of which reading positions on a document path do not overlap.

5. The document reading apparatus of claim 1, wherein said first image reading unit and said second image reading unit have the same main scanning cycle, of which reading directions are reverse each other.

6. The document reading apparatus of claim 3 wherein the frequencies of clocks of said image synthesizing unit and said image processing unit are higher than the frequencies of clocks of said first image reading unit and said second image reading unit.

7. The document reading apparatus of claim 3 wherein the frequencies of clocks of said image synthesizing unit and said image processing unit are twice the frequencies of clocks of said first image reading unit and said second image reading unit.

8. The document reading apparatus of claim 3 which further comprises an image separation unit for separating image data of said image processing unit into image data for one side of said document sheet and image data for the other side of said document sheet.

9. The document reading apparatus of claim 8 wherein said image separation unit separates image data of said image processing unit on the basis of a first valid signal which takes said first image data only as valid and a second valid signal which takes said second image data only as valid.

10. The document reading apparatus of claim 8, further comprising a rotation unit configured to rotate one of two image data separated by said image separation unit by 180 degrees.

11. The document reading apparatus of claim 8 which further comprises a mirror image processing unit for performing a mirror image processing on one of two data from separation by said image separation unit.

12. The document reading apparatus of claim 1 wherein said first image reading unit and said second image reading unit are different in document reading position in the sub-scanning direction.

13. The document reading apparatus of claim 1 wherein said image synthesizing unit specifies an invalid area according to a shift in document reading position in said sub-scanning direction, and stuffs said invalid area with white data.

14. The document reading apparatus of claim 1 wherein said image synthesizing unit inserts white data of at least one picture element between said first image data and said second image data.

15. The document reading apparatus of claim 3 wherein said image processing unit performs a mode of image processing suitable for the characteristics of said first image reading unit and said second image reading unit respectively.

16. The document reading apparatus of claim 15 wherein said image processing unit performs processing on the basis of table data suitable for the characteristics of said first image reading unit and said second image reading unit respectively.

17. The document reading apparatus of claim 15 wherein said image processing unit performs image processing on the basis of operation coefficients suitable for the characteristics of said first image reading unit and said second image reading unit respectively.

18. The document reading apparatus of claim 15 which further comprises:

a storage unit for storing image data from said image processing unit, a reading unit for reading out image data from said storage unit, an image separation unit for separating image data of said reading unit into data for one side of said document sheet and image data for the other side of said document sheet.

19. The document reading apparatus of claim 18 wherein said storage unit compresses and stores image data and wherein said reading unit reads out and decompresses compressed data.

20. A document reading method for reading both sides of a document sheet by simultaneously reading both sides at an equal reading speed, said method comprising:

a first reading step comprising reading one side of the document sheet;

a second reading step comprising reading the opposite side of the document sheet;

a first speed changing step comprising writing into a line buffer first image data read by the first reading step at the same speed as the reading speed of the first reading step, and reading the first image data from the line buffer at double the reading speed;

a second speed changing step comprising writing into another line buffer second image data read by the second reading step at the same speed as the reading speed of the second reading step, and reading the second image data from the other line buffer at double the reading speed; and synthesizing first image data after the first speed changing step and second image data after the second speed changing step in a main scanning period of one of the two reading steps.

21. The document reading method of claim 20, wherein synthesizing the image data for said one side and the image data for the opposite side comprises a step of placing said two image data side by side in the main scanning period of one of the two image reading.

22. The document reading method of claim 20 which further performs image processing on said synthesized image data in the main scanning period.

* * * * *